Dec. 15, 1964
F. E. UITHOVEN
3,161,823
DEVICE FOR TESTING THE CONCENTRATION
OF AN ELECTROLYTE IN SOLUTION
Filed April 23, 1963
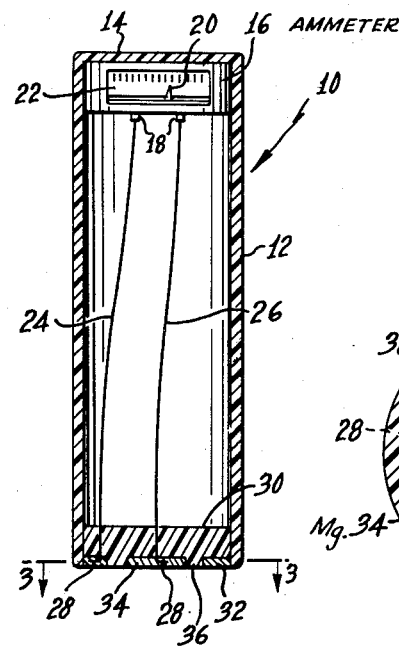
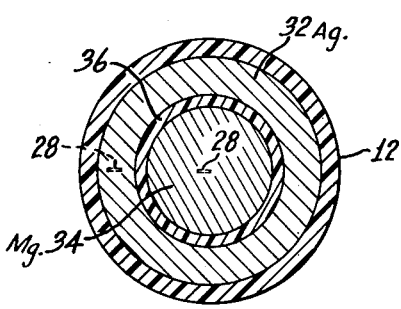
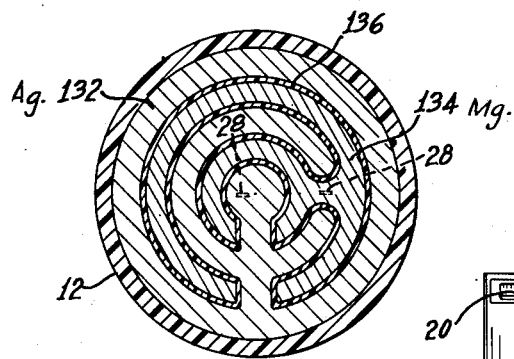
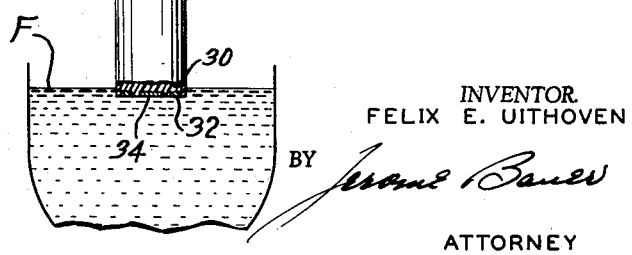
INVENTOR.
FELIX E. UITHOVEN
BY *Jerome Bauer*
ATTORNEY

United States Patent Office 3,161,823
Patented Dec. 15, 1964

3,161,823
DEVICE FOR TESTING THE CONCENTRATION
OF AN ELECTROLYTE IN SOLUTION
Felix E. Uithoven, 268 Spruce St., West Hempstead, N.Y.
Filed Apr. 23, 1963, Ser. No. 275,007
1 Claim. (Cl. 324—29)

This invention relates to a device for measuring and indicating the current density of a galvanic solution.

The desideratum of the invention is to provide a device that will measure and indicate the current density of galvanic solutions consistently accurate without concern as to the manner of handling the device or as to its extent of immersion into the solution thereby enabling the device to be utilized without any degree of skill.

An object of the invention is to provide a measuring and indicating device that is completely self-contained, one that has and requires no separate power supply for its operation, a device that is extremely compact and easily held in the palm of the hand and that is rugged in construction and simple in operation.

Another object of the invention is to provide a device which, being self-contained to include electrodes and indicating structure, is simply manipulated so that no matter how deep or how shallow the same is inserted into the solution to be tested, the effective surfaces of the electrodes will always be subjected to the same area of contact with the solution and thereby consistently provide an accurate measurement of the concentration of the electrolyte in said solution.

A further object and feature of the invention resides in the unique arrangement of the electrodes on the device whereby a defined contact surface thereof is able to be placed in contact with the solution, and in such instance, the contact surfaces of all the electrodes of the device are subjected to contact with the solution equally and simultaneously.

Other and further objects of this invention reside in the structures and arrangements hereinafter more fully described with reference to the accompanying drawing in which:

FIG. 1 is a front elevation of the measuring and indicating device constructed according to the teaching of the invention with parts thereof shown in cross-section, FIG. 2 is an illustration of the device immersed in a solution, FIG. 3 is a cross-section of FIG. 1 taken along lines 3—3 thereof, and FIG. 4 is a cross-section similar to FIG. 3 illustrating a modification thereof.

Referring now to the drawing, the measuring and indicating device thereshown is generally identified by the numeral 10. The device 10 comprises a body 12 that is shown to be tubular in cross-section. The body 12 may be formed of any well known preferably non-conductive material. In practice, it has been found that Lucite or other plastic materials are well suited for the purposes inasmuch as the same are light in weight. The body 12 is open at its lower end and closed at its upper end 14.

Mounted within the body 12 and seated against the inner surface of the upper end 14 thereof is an ammeter 16. The ammeter may be of any well known construction provided with a plurality of terminals 18 and an indicating needle 20. The needle 20 is adapted to be actuated in accordance with the current transmitted through the terminals 18 for movement relative to the ammeter scale 22 whose surface is provided with a plurality of divisions or other indices to enable an indication and a reading of the concentration of the electrolyte in the solution being tested.

The length of the body 12 is substantially immaterial, it being necessary only that the same be fluid tight within the interior thereof to contain or house electrical connectors 24 and 26 in such manner that the same are prevented from shorting and from completing a circuit across the terminals 18 of the ammeter 16. Each of the electrical connectors 24 and 26 is joined with a respective one of the terminals 18 of the ammeter. They extend in spaced relationship along the length of the body 12 and complete a circuit at their pigtails 28 each of which is in electrical conducting engagement with a metallic electrode.

The lower or normally open end of the body 12 is sealed fluid tightly closed by an electrode supporting member 30. The electrode supporting member 30 is formed of a non-conductive material. Once again, it has been found in practice that the member 30 may be suitably molded of a plastic resin and when tightly pressed into place within the open end of the body 12 fluid tightly seals the same thereby preventing entry of fluid between the member 30 and its surrounding wall of the body 12. This serves to maintain the interior of the body dry and thus prevent possible shorting of the electrical connectors 24 and 26.

The electrode supporting member 30 is provided with a plurality of through openings which enable the passage of the electrical connectors 24 and 26 therethrough to be joined with the terminals 18 of the ammeter. The pigtail ends 28 of the connectors 24 and 26 are adapted to be retained in complete electrical contact with respective metallic electrodes 32 and 34. It has been found that the supporting member 30 may be molded with insulating separators 36 thereby defining electrode receiving areas between them. The electrodes 32 and 34 are inserted into or retained in the spaces defined between the insulating separators in tight electrical engagement with the pigtails 28. It has been found that by the process of electrodeposition, the metallic electrode members 32 and 34 may be formed between the insulating separators 36 in such manner that the deposited metal adheres in complete electrical contact with the pigtail 28 positioned in the respective spaces.

In FIG. 3, the electrodes 32 and 34 are circularly shaped and each is separated from the other by a ring-shaped insulating separator 36. Thus, the inner electrode 34 is encompassed by the outer electrode 32 and each is retained and supported in the electrode supporting member 30 in insulated spaced relationship from each other by the ring-shaped separator 36 therebetween. Both electrodes have flat exposed contact surface areas facing outwardly from the lower end of the body 12. Each of these flat contact surfaces is in planar relationship with the other and with the height of the insulating separator 36. Hence, neither contact surface or either of the electrodes 32 and 34 extends a greater distance or further beyond the lower end of the body 12 than the other.

Because these flat contact surface areas of the electrodes 32 and 34 are in the same planar relationship with each other and with the height of the insulating separator 36, when the body 12 is lowered for immersion in a fluid F (see FIG. 2), the complete flat surface area of each electrode 32 and 34 is simultaneously and equally immersed in contact with the fluid. This novel arrangement of electrodes assures that only the exposed surface contact area of the electrodes 32 and 34 are immersed in operating contact with the fluid. Further, no more of one contact surface is immersed in the fluid than that of any other contact surface. Hence, each time the body 12 is lowered into a fluid and the electrodes 32 and 34 immersed therein, the same area of contact of the electrodes will be subjected to contact with the electrolyte in the solution thereby assuring that the current transmitted through the electrodes is consistent for each immersion.

In the embodiment of FIG. 4, there is shown a plurality of electrodes one of which may be silver 132 and the other magnesium 134 as may be contacts 32 and 34 of the embodiment shown in FIG. 3. However, in FIG. 4, the flat surface contact areas of the electrodes is materially increased by arranging the same in discontinuous arcuate form whereby the electrode 132 is at least partially encompassed by a discontinuous arcuate portion of the electrode 134 and in like manner the electrode 134 is at least partially encompassed by the electrode 132. However, in each instance the electrodes 132 and 134 are spaced and insulated from each other by the separator 136 that is formed on the electrode supporting member. The pigtails 28 of the electrical connectors 24 and 26 may be joined into electrical engagement with the respective electrodes 132 and 134 in the same manner as previously described.

In use, the present invention will consistently provide the same and accurate measurement and indication of the concentration of an electrolyte in solution. The invention may be utilized to test the acidity of an aquarium or the pH factor of soil solution or other solutions. The same requires no external source of power. Each time the electrodes are lowered into the solution to be tested, the same are fully and equally immersed in the fluid with no one portion of any one of the electrodes being immersed more than another of the electrodes.

The unique arrangement of the electrodes in the embodiment shown in FIG. 3 as well as that shown in FIG. 4 deserves comment. In each of these embodiments, the inner electrode is encompassed or at least partially encompassed by the other or outer electrode. In consequence, the large or elongated surface contact area of the inner electrode is positioned adjacent to and at least partially encompassed by the other electrode to provide large adjacently arranged areas of contact with the electrolyte in the solution. This arrangement of the electrodes is such that current is transmitted between the exposed surface area of the inner electrode and the exposed surface area of the encompassing adjacent outer electrode. Because of the encompassing arrangement, there is greater exposed surface areas on each of the electrodes than is normally provided or capable of being provided in the case where sheet, flat or pin type electrodes are utilized. The encompassed surface of the inner electrode and the encompassing surface of the outer electrode provide adjacent areas of current transmission that serve to enhance the ability of the metallic electrodes to collect, transmit and measure the concentration of the electrolyte in the solution.

While there have been shown and described and pointed out the fundamental novel features of the invention as applied to several preferred embodiments thereof, it will be understood that various omissions and substitutions and changes in the form and details of the devices illustrated and in their operation may be made by those skilled in the art, without departing from the spirit of the invention. It is the intention, therefore, to be limited only as indicated by the scope of the claim appended hereto.

I claim:

A device for testing the concentration of an electrolyte in solution comprising a hand manipulatable substantially hollow body open at one end thereof, an ammeter in said body at an end thereof remote from said open end, said ammeter having two terminals, two relatively insulated electrical conductors each connected with a respective one of said terminals and extending in said body from said ammeter to said open end, an insulating electrode support of non-conductive material in said body and closing said open end thereof to retain said hollow body fluid tight to prevent the passage of fluid into said body from said open end and the shorting of said terminals, said electrode support and said open end of said body forming a planar horizontally disposed immersion end, said electrode support having two sets of recesses defined therein, one set of said recesses forming a plurality of arcs, another set of said recesses forming a plurality of discontinuous arcs which partially encompass said one set of arcs, said sets of recesses being defined in the end of said electrode support facing in the direction of the open end of said body and recessed inward from the open end of said body and from said planar horizontally disposed immersion end, two electrodes of dissimilar electrically conductive material each connected with a respective one of said conductors, each of said electrodes being contained within a respective one of said sets of recesses and conforming to the set of discontinuous arcs thereof with one of said electrodes being partially encompassed by a discontinuous arcuate portion of another of said electrodes, each of said electrodes having a single exposed surface, said support means insulating each of said electrodes from the other, and each electrode having a flat elongated surface defined in planar horizontal alignment with said planar horizontally disposed immersion end to insure their simultaneous and equal immersion at their single exposed surface for contact with the electrolyte to test the concentration thereof.

References Cited by the Examiner

UNITED STATES PATENTS

| | | | |
|---|---|---|---|
| 1,373,951 | 4/21 | Cox et al. | 324—30 |
| 1,735,878 | 11/29 | Pfanhauser | 324—29 |
| 2,215,213 | 9/40 | Ellis | 324—30 |
| 2,593,252 | 4/52 | Booth | 324—30 |
| 3,019,384 | 1/62 | Wayne | 324—29 |

WALTER L. CARLSON, *Primary Examiner.*

FREDERICK M. STRADER, *Examiner.*